United States Patent
Hino et al.

(10) Patent No.: US 7,365,815 B2
(45) Date of Patent: Apr. 29, 2008

(54) PHASE RETARDATION FILM AND LIQUID CRYSTAL DISPLAY DEVICE INCLUDING THE SAME

(75) Inventors: Kyoko Hino, Sodegaura (JP);
Toshihiko Suzuki, Ichihara (JP);
Hiroaki Takahata, Ichihara (JP);
Ryuma Kuroda, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 491 days.

(21) Appl. No.: 11/149,442

(22) Filed: Jun. 10, 2005

(65) Prior Publication Data

US 2005/0280758 A1 Dec. 22, 2005

(30) Foreign Application Priority Data

Jun. 16, 2004 (JP) ............... 2004-178079

(51) Int. Cl.
*G02F 1/1335* (2006.01)
*G02F 1/1343* (2006.01)
*G02B 15/15* (2006.01)

(52) U.S. Cl. .............. 349/117; 349/141; 359/677

(58) Field of Classification Search ........... 349/117, 349/141; 359/677
See application file for complete search history.

(56) References Cited

U.S. PATENT DOCUMENTS

| 6,115,095 | A | 9/2000 | Suzuki et al. | |
|---|---|---|---|---|
| 6,184,957 | B1 | 2/2001 | Mori et al. | |
| 6,538,712 | B1* | 3/2003 | Winker et al. | 349/117 |
| 2002/0005925 | A1 | 1/2002 | Arakawa | |
| 2002/0060762 | A1* | 5/2002 | Arakawa | 349/117 |
| 2002/0169267 | A1* | 11/2002 | Minakuchi et al. | 526/282 |
| 2004/0027520 | A1* | 2/2004 | Elman et al. | 349/117 |
| 2005/0117217 | A1 | 6/2005 | Yamaoka | |
| 2007/0064177 | A1* | 3/2007 | Itadani et al. | 349/98 |

FOREIGN PATENT DOCUMENTS

| CN | 1385718 A | 12/2002 |
|---|---|---|
| EP | 0 587 890 A1 | 3/1994 |
| JP | 10-54982 | 2/1998 |
| JP | 11-133408 | 5/1999 |
| JP | 2002-40258 | 2/2002 |
| WO | WO 03/107049 | 12/2003 |

* cited by examiner

*Primary Examiner*—Mike Qi
(74) *Attorney, Agent, or Firm*—Foley & Lardner LLP

(57) ABSTRACT

Disclosed is a phase retardation film including two outer layers facing each other, and an inner layer interposed between the outer layers, each of the outer layers are formed of a non-styrene polymeric material and the inner layer being formed of a polymeric material with a negative intrinsic birefringence, wherein the phase retardation film has a negative intrinsic birefringence and a Haze from 0% to 1%. A liquid crystal display device including the phase retardation film is also disclosed.

12 Claims, 1 Drawing Sheet

PHASE RETARDATION FILM AND LIQUID CRYSTAL DISPLAY DEVICE INCLUDING THE SAME

BACKGROUND OF THE INVENTION

1. Technical Field

The present invention relates to phase retardation films and to liquid crystal display devices including the phase retardation films.

2. Description of the Related Art

In late years, applications of liquid crystal display devices (LCD) as information display devices, such as mobile phones, personal digital assistants (PDA), personal computers and television monitors, have been increasing rapidly due to their various advantages such as low power consumption, low voltage operation, light weight and reduced thickness. With development of the LCD technology, various modes of LCD have been proposed. Such proposals are solving problems with the LCD regarding response speed, contrast and viewing angle. However, the LCD are still pointed out that their viewing angle is narrower than that of cathode ray tubes (CRT), in other words, the LCD are of greater viewing angle dependency. Therefore, a variety of solutions for viewing angle compensation have been proposed.

As one of measures of viewing angle compensation, liquid crystal cells inherently capable of enlarging viewing angles have been proposed, for example, those of optically compensated bend (OCB) mode, vertical alignment (VA) mode and in-plane switching (IPS) mode.

Among them, the IPS mode is superior in viewing angle characteristic to the other modes because liquid crystal molecules orient parallel to substrate planes and in the same direction. However, viewing angle dependency is still a problem with various types of liquid crystal display devices with improved viewing angle characteristics including the IPS mode.

Various approaches have been proposed to compensate viewing angle dependency. One of them is an approach to compensate the viewing angle of liquid crystal display device by use of a phase retardation film. For example, Japanese Published Patent Application JP 11-133408 (corresponding to U.S. Pat. No. 6,115,095) discloses that a phase retardation film (a compensation layer) having an optic axis at a positive uniaxiality in a direction perpendicular to the substrate, namely, a phase retardation film in which molecules are oriented uniaxially in the thickness direction of the film is disposed between a liquid crystal substrate and a polarizing plate in the IPS mode.

However, viewing angle characteristics of liquid crystal display devices having a phase retardation film with an optic axis at a positive uniaxiality in a direction perpendicular to the substrate are still far inferior to those of CRTs.

As an approach to improve the viewing angle dependency of liquid crystal display devices of IPS mode, Japanese Published Patent Application JP 10-54982 (corresponding to U.S. Pat. No. 6,184,957) discloses to dispose, between a liquid crystal cell substrate and at least one polarizing plate, a monolayer phase retardation film (optical compensation sheet) made of a styrene-based polymer, which exhibits a negative uniaxiality when being uniaxially stretched.

Phase retardation films usually laminated with polarizing plates, liquid crystal cell substrates or the like through adhesive. However, monolayer phase retardation films composed of a styrene based polymer may crack due to temperature change when being laminated with other components such as polarizing plates and glass cells through adhesive and installed into liquid crystal display devices. The larger liquid crystal display devices, the more frequently cracking of phase retardation films occurs. In particular, it occurs very frequently in liquid crystal display devices of a size 30 inches or greater.

In addition, phase retardation films are required to have good reworkability. The reworkability is a performance which is required in the production of liquid crystal display devices. In the production of liquid crystal display devices, a phase retardation film is laminated first on a polarizing plate by a first adhesive. Then, a liquid crystal cell is laminated on the phase retardation film of the resulting laminate by a second adhesive. In the step of lamination to the liquid crystal cell, the laminate of the polarizing plate and the phase retardation film must, but often fails to, be combined with the liquid crystal cell at a high accuracy of angle adjustment. If the laminate and the liquid crystal cell are combined together at a wrong angle, the liquid crystal cell must be peeled away from the laminate and then combined again with another laminate of a polarizing plate and a phase retardation film. In the peeling of a phase retardation film from a liquid crystal cell, it is required that no chip of the phase retardation film or of the second adhesive used for laminating the phase retardation film to the liquid crystal cell remain on the surface of the liquid crystal cell. If a phase retardation film can be peeled off from a liquid crystal cell completely without leaving anything on the surface of the liquid crystal cell, the phase retardation film is considered to "be of good reworkability". Monolayer phase retardation films made of a styrene-based polymer are of insufficient reworkability.

SUMMARY OF THE INVENTION

An object of the present invention is to provide phase retardation films which are not only useful for improving viewing angle characteristics of liquid crystal display devices but also of good reworkability and exhibit good durability when being laminated to other components such as polarizing plates and glass cells by adhesive and then used as liquid crystal display devices. Another object of the invention is to provide liquid crystal display devices superior in viewing angle characteristic and durability.

In one aspect, the present invention provides a phase retardation film comprising two outer layers facing each other and an inner layer interposed between the outer layers, each of the outer layers are formed of a non-styrene polymeric material and the inner layer being formed of a polymeric material with a negative intrinsic birefringence, wherein the phase retardation film has a negative intrinsic birefringence and a Haze from 0% to 1%. In another aspect, the present invention provides a liquid crystal display device comprising a liquid crystal cell including two transparent substrates disposed in parallel and facing each other and a liquid crystal layer sandwiched by the substrates, two polarizing plates facing each other at least across the liquid crystal layer, and a phase retardation film like that mentioned above disposed between the liquid crystal cell and at least one of the polarizing plates.

Phase retardation films according to the present invention are not only useful for improving viewing angle characteristics of liquid crystal display devices but also of good reworkability and exhibit good durability when being laminated with other components such as polarizing plates and liquid crystal cells by adhesive and then used as liquid crystal display devices. Liquid crystal display devices according to the present invention are superior in viewing angle characteristic and durability.

BRIEF DESCRIPTION OF DRAWINGS

FIGS. 1(A) and 1(B) illustrate a constitution example of a liquid crystal display device according to the present invention, wherein FIG. 1(A) is a schematic cross-sectional view, whereas FIG. 1(B) is a perspective view for illustrating the axis relationship. The layer constitution and axis relationship illustrated in the drawings correspond to those of the liquid crystal display device produced in Example 1.

DESCRIPTION OF THE PREFERRED EMBODIMENTS

Figure 1A:
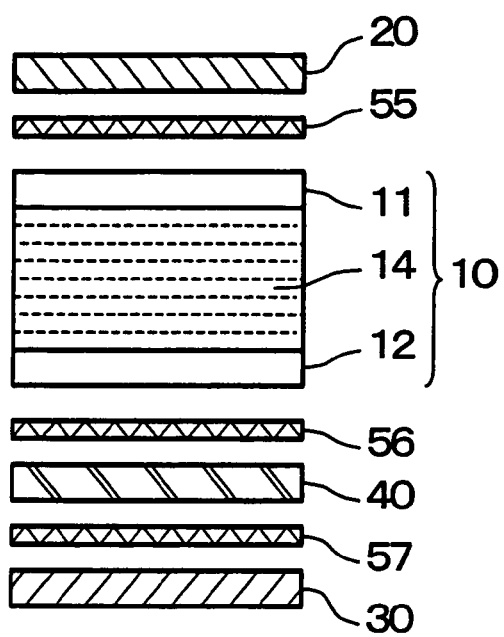

Phase retardation films of the present invention have a negative intrinsic birefringence and a haze from 0% to 1% as measured in accordance with JIS K7136. Such phase retardation films are extremely superior in viewing angle characteristic.

In addition, the phase retardation film of the present inventions are phase retardation films including two outer layers facing each other and an inner layer interposed between the outer layers, wherein each of the outer layers is formed of a non-styrene polymeric material and the inner layer is formed of a polymeric material with a negative intrinsic birefringence. Due to such a constitution, the films exhibit good durability as well as good viewing angle characteristics when being laminated to other components such as polarizing plates and liquid crystal cells with adhesive and then used as liquid crystal display devices.

From the viewpoint of inhibiting light leakage, it is desirable that the absolute value of the photoelastic coefficient of the phase retardation films of the present invention be $10 \times 10^{-12}$ $Pa^{-1}$ or less, more desirably $8 \times 10^{-12}$ $Pa^{-1}$ or less, and also preferably $10 \times 10^{-15}$ $Pa^{-1}$ or more. The "light leakage" used herein is a phenomenon in which light leaks from the periphery of a liquid crystal display device in which a phase retardation film has been installed. The phase retardation films desirably have an in-plane phase retardation of from 80 to 250 nm from the viewpoint of viewing angle compensation.

The photoelasticity is a property to exhibit optical anisotropy to cause birefringence when an isotropic material is applied with external force to produce a stress therein. When the stress acting on a material (the force applied per unit area) is represented by s and the birefringence is represented by $\Delta n$, the stress $\sigma$ and the birefringence $\Delta n$ are proportional and expressed as $\Delta n = C\sigma$, wherein the C is a photoelastic coefficient. In other words, when the stress $\sigma$ acting on the material is shown on the horizontal axis and the birefringence $\Delta n$ the material has when the stress acts is shown on the vertical axis, the relationship between these factors is theoretically linear. The slope of the straight line is the photoelastic coefficient C.

Taking into account the environment where phase retardation films are used, the polymeric material forming the inner layer desirably has a glass transition temperature of 100° C. or higher, more desirably 110° C. or higher, and also desirably 250° C. or lower, more desirably 220° C. or lower. On the other hand, each of the polymeric materials forming the outer layers desirably has a glass transition temperature of 100° C. or higher, more desirably 105° C. or higher, and also desirably 250° C. or lower, more desirably 220° C. or lower. In the present invention, the glass transition temperature refers to a glass transition temperature measured in accordance with JIS K7121. Phase retardation films of the present invention are produced by stretching. From the viewpoint of ease of stretching, the glass transition temperature of the polymeric material forming the inner layer is preferably higher than those of the polymeric materials forming the outer layers.

In phase retardation films of the present invention, the polymeric material forming the inner layer must have a negative intrinsic birefringence. The polymeric material having a negative intrinsic birefringence refers to a polymeric material such that when light is incident on a layer in which molecules are aligned uniaxially, the refraction index of light in the alignment direction becomes smaller than the refraction index of light in a direction perpendicular to the alignment direction. Examples of such polymeric materials include styrene-based polymers, e.g. polystyrene, copolymers of styrene and/or styrene derivative with other monomer(s), vinylnaphthalene polymers, vinylbiphenyl polymesr, vinylanthracene polymers, vinylpyridine polymers, vinylcarbazole polymers and acenaphthylene polymers; acrylic ester based polymers, methacrylic ester based polymers, acrylonitrile based polymers, methacrylonitrile based polymers, phenylacrylamide based polymers, phenylcarbonyloxynorbornene based polymers, biphenylcarbonyloxynorbornene based polymers, naphthylcarbonyloxynorbornene based polymers, anthracenylcarbonyloxynorbornene based polymers, phenylcarbonyloxytetracyclo[$4.4.0.1^{2,5}.1^{7,10}$]-3-dodecene based polymers, biphenylcarbonyloxytetracyclo[$4.4.0.1^{2,5}.1^{7,10}$]-3-dodecene based polymers, naphthylcarbonyloxytetracyclo[$4.4.0.1^{2,5}.1^{7,10}$]-3-dodecene based polymers, anthracenylcarbonyloxytetracyclo[$4.4.0.1^{2,5}.1^{7,10}$]-3-dodecene based polymers, vinylcyclohexane based polymers, α-olefin/N-phenylmaleimide based copolymers and mixtures thereof. When the polymeric material is a mixture of two or more polymers, not all the polymers must have a negative intrinsic birefringence and it is only required that the mixture, namely the overall polymeric material, have a negative intrinsic birefringence.

As the polymeric material forming the inner layer, preferred, because of small absolute value of photoelasticity and good heat resistance, are styrene-based polymers, e.g. polystyrene, copolymers of styrene and/or styrene derivative with other monomer(s) vinylnaphthalene polymers, vinylbiphenyl polymers, vinylanthracene polymers, vinylpyridine polymers, vinylcarbazole polymers and acenaphthylene polymers; phenylacrylamide based polymers, phenylcarbonyloxynorbornene based polymers, biphenylcarbonyloxynorbornene based polymers, naphthylcarbonyloxynorbornene based polymers, anthracenylcarbonyloxynorbornene based polymers, phenylcarbonyloxytetracyclo[$4.4.0.1^{2,5}.1^{7,10}$]-3-dodecene based polymers, biphenylcarbonyloxytetracyclo[$4.4.0.1^{2,5}.1^{7,10}$]-3-dodecene based polymers, naphthylcarbonyloxytetracyclo[$4.4.0.1^{2,5}.1^{7,10}$]-3-dodecene based polymers, anthracenylcarbonyloxytetracyclo[$4.4.0.1^{2,5}.1^{7,10}$]-3-dodecene based polymers, vinylcyclohexane based polymers and α-olefin/N-phenylmaleimide based copolymers. Examples of the other monomers to be copolymerized with styrene and/or styrene derivative include maleic anhydride, cyclic olefins, acrylonitrile, butadiene, etc.

It is particularly desirable that the polymeric material forming inner layer be a copolymer obtained by copolymerization of at least one compound selected from the group (A) defined below, at least one compound selected from the group (B) defined below and at least one compound selected from the group (C) defined below because the copolymer has a photoelastic coefficient whose absolute value is small and it has good heat resistance and also because phase retardation films produced from the copolymer have well-balanced strength and flexibility.

group (A): α-olefins having two or more carbon atoms;
group (B): aromatic vinyl compounds; and
group (C): cyclic olefins.

The α-olefins having two or more carbon atoms of group (A) include linear α-olefins such as ethylene, propylene, 1-butene, 1-pentene, 1-hexene, 1-octene, 1-decene, 1-dodecene, 1-tetradecene, 1-hexadecene, 1-octadecene and 1-eicosene, and branched α-olefins such as 4-methyl-1-pentene, 3-methyl-1-pentene and 3-methyl-1-butene. From the viewpoint of flexibility of films, ethylene, which is a linear α-olefin having two carbon atoms, propylene, which is a linear α-olefin having three carbon atoms and 1-butene, which is a linear α-olefin having four carbon atoms are desirable as the compound selected from group (A). Ethylene is more desirable.

Aromatic vinyl compounds of group (B) are aromatic compounds having a structure in which a vinyl group is joined directly to an aromatic ring. Such compound include benzonoid or non-benzonoid, monocyclic, non-condensed polycyclic or condensed polycyclic, aromatic vinyl compounds and their derivatives. Specific examples include: styrene; nucleus-substituted styrenes in which a hydroxyl group, alkoxyl group, carboxyl group, acyloxy group, halogen or the like has been introduced to the benzene ring of styrene, such as alkylstyrenes, e.g. o-methylstyrene, m-methylstyrene, p-methylstyrene, 2,4-dimethylstyrene, o-ethylstyrene and p-ethylstyrene, hydroxystyrene, t-butoxystyrene, vinylbenzoic acid, vinylbenzyl acetate, o-chlorostyrene and p-chlorostyrene; vinylbiphenyl compounds such as 4-vinylbiphenyl and 4-hydroxy-4'-vinylbiphenyl; vinylnaphthalene compounds such as 1-vinylnaphthalene and 2-vinylnaphthalene; vinylanthracene compounds such as 1-vinylanthracene and 2-vinylanthracene; vinylcarbazole compounds such as 3-vinylcarbazole; acenaphthylene compounds; and vinylpyridine compounds such as 2-vinylpyridine and 3-vinylpyridine.

Cyclic olefins of group (C) are compounds which have a polymerizable carbon-carbon double bond in a carbon ring and are capable, when being copolymerized, of introducing an alicyclic ring, such as cyclobutane ring, cyclopetane ring, cyclohexane ring and a condensed ring composed of a combination of two or more rings, into a main chain of the resulting copolymer. Specific examples include bicyclo[2.2.1]hept-2-ene, which is generally called norbornene; norbornene derivatives in which an alkyl group having 1 to 4 carbon atoms, such as methyl group, ethyl group, butyl group and the like, has been introduced such as 6-alkylbicyclo[2.2.1]hept-2-ene, 5,6-dialkylbicyclo[2.2.1]hept-2-ene, 1-alkylbicyclo[2.2.1]hept-2-ene and 7-alkylbicyclo[2.2.1]hept-2-ene; tetracyclo[4.4.0.1$^{2,5}$.1$^{7,10}$]-3-dodecene, which is called dimethanooctahydronaphthalene; dimethanooctahydronaphthalene derivatives in which an alkyl group having three or more carbon atoms has been introduced to the 8th and/or 9th position of dimethanooctahydronaphthalene, such as 8-alkyltetracyclo[4.4.0.1$^{2,5}$.1$^{7,10}$]-3-dodecene and 8,9-dialkyltetracyclo[4.4.0.1$^{2,5}$.1$^{7,10}$]-3-dodecene; norbornene derivatives in which one or a plurality of halogens have been introduced in one molecule; and dimethanooctahydronaphthalene derivatives in which halogen has been introduced to the 8th and/or 9th position.

When the polymeric material forming the inner layer is a copolymer obtained by copolymerization of a compound or compounds selected from the group (A), a compound or compounds selected from the group (B) and a compound or compounds selected from the group (C), the copolymer is composed of from 5 to 35% by weight of structural units derived from the compound(s) selected from the group (A), from 20 to 45% by weight of the compound(s) selected from the group (B) and from 45 to 75% by weight of the compound(s) selected from the group (C). There is a tendency that when the content of constitutional units derived from the compound(s) selected from the group (B) is too small, the intrinsic birefringence of the phase retardation film is positive, whereas when too large, the photoelastic coefficient of the phase retardation film is large. It is possible to make a copolymer have well-balanced heat resistance and ductility by setting the content of constitutional units derived from the compound(s) selected from the group (B) within the above-mentioned range. Such a polymer can be produced by, for example, the method disclosed in Japanese Published Patent Application JP 2000-230024 (corresponding to U.S. Pat. No. 6,451,946).

Phase retardation films of the present inventions are phase retardation films including two outer layers facing each other and an inner layer interposed between the outer layers, wherein each of the outer layers is formed of a non-styrene polymeric material and the inner layer is formed of a polymeric material with a negative intrinsic birefringence. Each of the non-styrene polymeric materials forming the outer layers is a polymeric material containing constitutional units derived from aromatic vinyl compound(s) of the group (B) in a content of 10% by weight of less. The content of the constitutional units derived from aromatic vinyl compound(s) of the group (B) may be zero. The non-styrene polymeric materials forming the outer layers may be either the same or different. The non-styrene polymeric materials forming the outer layers may independently be either a single polymer or a mixture of two or more polymers. When the non-styrene polymeric material is a mixture of two or more kinds of polymers, not all the polymers must be non-styrene polymers. It is required only that the overall mixture contain constitutional units derived from aromatic vinyl compound(s) of the group (B) in a content of 10% by weight or less. It is desirable that the thicknesses and polymeric materials of the outer layers be chosen so that the phase retardation film has a negative intrinsic birefringence and a haze from 0% to 1% and so that the film exhibits a tensile stress of 3 to 5 MPa after a confirmation test described below conducted at 23° C.

[Confirmation Test]

From a phase retardation film produced by uniaxially stretching a multilayer film comprising two outer layers and an inner layer interposed therebetween, a strip-shaped specimen (for example, 10 mm (width)×150 mm (length)) was taken so that its longitudinal direction coincides with the stretching direction. A tensile stress of 5 MPa is applied to this specimen in its longitudinal direction. Under the application of the tensile stress, 0.5 ml of ethyl acetate is dropped to one of the outer layers of the specimen from a height of 2 cm and the specimen is then aged at 23° C. for one minute.

Phase retardation films of the present invention constituted in the above-mentioned manner exhibit good durability when being laminated with other components such as polarizing plates or glass cells with adhesive and then used as liquid crystal display devices.

Liquid crystal display devices are desired to have a reduced thickness. Phase retardation films, which are components of liquid crystal display devices, are also desired to be thin. In the present invention, if the intrinsic birefringence of a phase retardation film per se is negative, the non-styrene polymeric materials of the outer layers may independently have either a negative or positive intrinsic birefringence. However, when the non-styrene polymeric materials forming the outer layers have positive and large intrinsic birefringences, the inner layer must be thick. Accordingly, when a polymeric material forming an outer layer has a positive intrinsic birefringence, the value thereof is desirably small. The non-styrene polymeric materials of the outer layers are desirably each independently a hydrogenated product of a polymer produced by ring-opening polymerization of a cyclic olefin such as norbornene, norbornene derivative and tetracyclo[$4.4.0.1^{2,5}.1^{7,10}$]-3-dodecene, a copolymer of an α-olefin having two or more carbon atoms with such a cyclic olefin, or an acrylic polymer because these have a small intrinsic birefringence, exhibit a tensile stress of 3 to 5 MPa after the confirmation test at 23° C. and have good heat resistance.

The acrylic polymer used herein refers to a polymer made up of monomers containing acrylic ester and/or methacrylic ester and typically includes a polymer comprising constitutional units derived from acrylic ester and methacrylic ester in an combined content of 90% by weight or more; specific examples thereof include homopolymers of alkyl methacrylate and copolymers of alkyl methacrylate and alkyl acrylate. Specific examples of alkyl methacrylate include methyl methacrylate, ethyl methacrylate and propyl methacrylate. Specific examples of alkyl acrylate include methyl acrylate, ethyl acrylate and propyl acrylate. As such acrylic polymers, those commercially available as general-purpose acrylic resin may be employed.

When an acrylic polymer is used as a non-styrene polymeric material of an outer layer, the non-styrene polymeric material is desirably a composition comprising an acrylic polymer and rubber particles incorporated therein. The rubber particles incorporated in the acrylic polymer are desirably acrylic rubber particles. The acrylic rubber particles used herein refer to particles with rubber elasticity produced by polymerization of alkyl acrylate such as butyl acrylate and 2-ethylhexyl acrylate as a major component in the presence of polyfunctional monomer. The acrylic rubber particles may be particles having a multilayer structure including at least one layer with rubber elasticity. Examples of a multilayer acrylic rubber particle include a particle composed of an acrylic rubber core having rubber elasticity covered with hard alkyl methacrylate-based polymer, a particle composed of a hard alkyl methacrylate-based polymer core covered with an acrylic polymer with rubber elasticity, and a particle composed of a hard core covered with an acrylic polymer with rubber elasticity and overcoated with hard alkyl methacrylate-based polymer. Such rubber particles typically have an average particle diameter from 50 to 400 nm.

The content of such rubber particles is typically from 5 to 50 parts by weight per 100 parts by weight of the acrylic polymer. Since acrylic polymers and acrylic rubber particles are in the market in the form of their mixtures, such commercially available products may be used. Examples of such commercially available acrylic resin containing acrylic rubber particles include "HT55X" and "TECHNOLOY S001" available from Sumitomo Chemical Co., Ltd. Such acrylic resin compositions typically have a Tg of 120° C. or lower, preferably 110° C. or lower.

When the adhesion between the inner layer and an outer layer is poor, an adhesive resin layer may be provided between the inner layer and the outer layer. Examples of the adhesive resin include: (1) copolymers of an olefin monomer with one or more monomers selected from the group consisting of unsaturated carboxylic acids or their anhydrides, epoxy group-containing vinyl monomers, unsaturated carboxylic esters and vinyl esters, and (2) acid-modified olefinic polymers obtained by grafting with unsaturated carboxylic acids or their anhydrides.

Specific examples of (1) include ethylene-(meth)acrylic acid copolymers, metal-crosslinked products of ethylene-(meth)acrylic acid copolymers, ethylene-glycidyl methacrylate copolymers, ethylene-glycidyl methacrylate-vinyl acetate copolymers, ethylene-glycidyl methacrylate-methyl (meth)acrylate copolymers, ethylene-(meth)acrylic ester copolymers, ethylene-(meth)acrylic ester-maleic anhydride copolymers and ethylene-vinyl acetate copolymers.

Specific examples of (2) acid-modified olefinic polymers obtained by grafting with unsaturated carboxylic acids or their anhydrides include maleic anhydride graft-modified ethylene based polymers, maleic anhydride graft-modified propylene based polymers, and maleic anhydride graft-modified cyclic olefin based polymers.

Particularly, when a polymer including constitutional units derived from cyclic olefin is used in an outer layer and/or the inner layer and the adhesion between the outer layer and the inner layer is poor, it is desirable to use a graft-modified cyclic olefin-based polymer obtained by grafting with unsaturated carboxylic acid or its anhydride as an adhesive resin because it is effective for enhancement of the adhesion. As the graft-modified cyclic olefin-based polymer, that disclosed in Japanese Published Patent Application JP 5-70640 may be used.

The thickness of the adhesive resin layer is desirably from 0.01 to 10 μm, more desirably from 0.1 to 5 μm.

Phase retardation films of the present invention are desirably films obtained by stretching coextruded multilayer films having an inner layer and an outer layer on each side of the inner layer For the stretching, uniaxial stretching is desirably used and uniaxial hot stretching is more desirable. In the case where optical uniaxiality is important, free-end longitudinally uniaxial stretching is preferable.

Phase retardation films of the present invention can be employed as viewing angle compensation elements in liquid crystal display devices. Liquid crystal display devices including phase retardation films of the present invention comprise a liquid crystal cell including two transparent substrates disposed in parallel and facing each other and a liquid crystal layer sandwiched by the substrates, two polarizing plates facing each other at least across the liquid crystal layer, and a phase retardation film of the present invention disposed between the liquid crystal cell and at least one of the polarizing plates. As the transparent substrates, those generally used in liquid crystal display devices are applicable without any limitations. Also regarding the polarizing plates, those generally used in liquid crystal display devices are applicable without any limitations.

In liquid crystal display devices including therein phase retardation films of the present invention, it is desirable that the liquid crystal layer be one in which liquid crystal molecules are oriented parallel to the transparent substrates in the vicinity of the transparent substrate in a state where no electric field is applied. Here, "parallel to" means that the angle with respect to the substrates is within the range of 0±10°. The liquid crystal operating mode of the liquid crystal layer is desirably in-plane switching mode (IPS mode), twist nematic mode (TN mode) and super twist nematic mode (STN mode). In particular, excellent viewing angle characteristics are achieved in the IPS mode. The liquid crystal layer of the IPS mode is a liquid crystal layer in which liquid crystal molecules are oriented parallel to transparent substrates in the identical direction in the vicinity of the transparent substrates in a state where no voltage is applied and the orientation state of the liquid crystal molecules changes in a lateral electric field in which voltage is applied parallel to the substrates.

When a phase retardation film of the present invention is built in a liquid crystal display device, the phase retardation film is usually joined to a polarizing plate and a liquid crystal cell through adhesive. The following are representative constitution examples of liquid crystal display devices in which a phase retardation film of the present invention has been built.

[Constitution Example 1]
polarizing plate/adhesive/phase retardation film/adhesive/liquid crystal cell/adhesive/polarizing plate;

[Constitution Example 2]
polarizing plate/adhesive/liquid crystal cell/adhesive/phase retardation film/adhesive/polarizing plate; and

[Constitution Example 3]
polarizing plate/adhesive/phase retardation film/adhesive/liquid crystal cell/adhesive/phase retardation film/adhesive/polarizing plate.

As an adhesive for jointing a phase retardation film and a polarizing plate (henceforth referred to as "first adhesive") to an adhesive for jointing a phase retardation film to a liquid crystal cell substrate (henceforth referred to as "second adhesive"), adhesives comprising acrylic resin, epoxy resin, urethane resin, silicone resin, butyral resin or the like are desirably used because of their transparency. From the viewpoint of durability of liquid crystal display devices in which a phase retardation film of the present invention having outer layers formed of non-styrene polymeric materials, the first and second adhesives are each preferably an adhesive comprising a single kind of copolymer which has a glass transition temperature from −50° C. to −20° C. and which has been produced by copolymerization of n-butyl acrylate and other monomer.

The liquid crystal display devices of the present invention can be fabricated into image display devices by mounting a light source (backlight) outside one of the polarizing plates.

EXAMPLES

The present invention is explained with reference to Examples below. The invention, however, is not limited to the Examples.

(1) Haze

The haze was measured in accordance with JIS K7136.

(2) Intrinsic Birefringence, $\Delta N_0$

The Intrinsic birefringence $\Delta N_0$ of a polymeric material was determined in accordance with the corrected stress-optic law described in the following documents:

T. Inoue at al., "Polymer", vol. 38, page 1215, 1997;
T. Inoue at al., "Rheologica Acta", vol. 36, page 239, 1997;
T. Inoue et al., "Macromolecules", vol. 29, page 6240, 1996;
T. Inoue et al., "Macromolecules", vol. 24, page 5670, 1991; and
T. Inoue et al., "Kobuhshi Ronbunshu (Japanese Journal of Polymer Science and Technology)", vol. 53, page 602, 1996.

As a measuring apparatus, a commercially available viscoelasticity analyzer with an optical system for measuring birefringence was used. A vibration strain which periodically changes with time was applied to a polymeric material and the change of the stress produced and the change of birefringence were measured simultaneously. Using the results of the measurement, $C_R$ and $E'_R(\infty)$ were determined on the basis of the corrected stress-optic law. Then, $\Delta N_0$ was calculated by substituting the values obtained into the following equation:

$$\Delta N_0 = 5 C_R E'_R(\infty)/3$$

(3) Determination of the Sign (Positive/Negative) of Intrinsic birefringence

The sign of the intrinsic birefringence of a phase retardation film was determined by use of the following procedure.

For a uniaxially oriented film composed of a polymer which is known to have a positive intrinsic birefringence (specifically, TOPAS 6013 manufactured by the Ticona, $\Delta N_0 = +0.024$), the in-plane phase retardation (R) is measured by use of a phase retardation analyzer (KOBRA-CCD, manufactured by Oji Scientific Instruments). Subsequently, this uniaxially oriented film and a uniaxially oriented phase retardation film for determination of the sign of its intrinsic birefringence are superposed so that their stretching directions become parallel to each other. Then, the in-plane phase retardation (R') is measured. When R'<R, the intrinsic birefringence of the phase retardation film is determined to be negative; whereas when R'>R, the intrinsic birefringence of the phase retardation film is determined to be positive.

(4) In-plane Phase Retardation

The in-plane phase retardation was measured by means of a phase retardation analyzer (KOBRA-CCD manufactured by Oji Scientific Instruments).

(5) Photoelastic Coefficient, C

While a tensile stress of 0, 3, 6, 9 or 12 MPa was applied a specimen with a size 20 mm (width)×150 mm (length) along its longitudinal direction, the in-plane phase retardation was measured for each tensile stress. The quotient obtained by dividing each in-plane phase retardation by thickness of the specimen is birefringence $\Delta n$. The data obtained were plotted where the tensile stress $\sigma$ was shown on the horizontal axis and the birefringence $\Delta n$ at the time when the stress acted on the specimen was shown on the vertical axis. The relationship between these factors was approximated so as to be $\Delta n = C\sigma$ by the least-squares method. The slope C of the straight line produced was determined, which was used as a photoelastic coefficient.

(6) Glass Transition Temperature

The glass transition temperature was measured in accordance with JIS K7121.

(7) Confirmation Test

A specimen with a size 10 mm (width)×150 mm (length)×100 μm (thickness) was taken from a uniaxially oriented film so that the stretching direction became the short side direction (width direction). Then, a tensile stress of 5 MPa was applied to the specimen in its longitudinal direction. While the tensile stress was applied, 0.5 ml of ethyl acetate was dropped on the specimen from a height of 2 cm and the specimen was then aged for one minute. Thereafter, the stress was measured.

(8) Durability

A 30-inch laminate having a laminate constitution, polarizing plate/first adhesive/phase retardation film/second adhesive/glass plate, was prepared. The laminate was subjected to 200 cycles of thermal shock aging including a −40° C. aging for 30 minutes and a subsequent 85° C. aging for 30 minutes in a thermal shock tester (WINTEC THERMAL SHOCK CHAMBER manufactured by Kusumoto Chemicals, Ltd.). Thereafter, the condition of the phase retardation film was observed.

(9) Amount of Constitutional Units of Polymer

The amount (weight fraction) of each kind or constitutional units (monomer units) in a polymer was determined by $^1$H-NMR spectrum and $^{13}$C-NMR spectrum. The $^1$H-NMR spectrum was measured by a nuclear magnetic resonance apparatus (JNM-EX270 manufactured by JEOL) using dichloromethane-d2 as a solvent at room temperature. The $^{13}$C-NMR spectrum was measured by a nuclear magnetic resonance apparatus (AC 250 manufactured by BRUKER) using o-dichlorobenzene/o-dichlorobenzene-d4 (volume fraction=4/1) as a solvent at 135° C.

[Layer Suitable as Outer Layer]

(1) TOPAS 6013 (manufactured by Ticona) has Tg=140° C., $\Delta N_0$=+0.024 and a photoelastic coefficient of $-6 \times 10^{-12}$ Pa$^{-1}$. This polymer is made up of 23% by weight of constitutional units derived from ethylene and 77% by weight of constitutional units derived from norbornene. This polymer was formed into film by T-die extrusion and the film was uniaxially stretched by tentering. The oriented film had a thickness of 100 µm and an in-plane phase retardation of 110 nm. As a result of a confirmation test, the stress after aging was 5 MPa.

This monolayer film was used as a phase retardation film. The film was laminated with a polarizing plate and a glass plate using an adhesive, as the first adhesive, composed of a copolymer of n-butyl acrylate, acrylic acid and methyl acrylate (P0082 manufactured by Lintec Corp., Tg=−28° C.) and an adhesive, as the second adhesive, composed of a copolymer of n-butyl acrylate and acrylic acid (P3132 manufactured by Lintec Corp., Tg=−42° C.). After the lamination, the laminate of the polarizing plate and the phase retardation film was peeled off. No second adhesive or no phase retardation film remained on the glass plate; thus, the workability was good. In addition, the laminate of the phase retardation film, the polarizing plate and the glass plate was evaluated for its durability in accordance with the method described supra. After 200 cycles of thermal shock aging, no cracks were found in the phase retardation film.

Moreover, by producing a uniaxially oriented film having a thickness distribution of outer layer/inner layer/outer layer=from 5/1/5 to 1/8/1 and an overall thickness from 30 to 200 µm using the above-mentioned polymer for both outer layers and a polymer of Reference Example 2 shown later for the inner layer, it is possible to obtain a phase retardation film which is superior in reworkability, durability and capability of improving viewing angle characteristic.

(2) ZEONOR 1420R (manufactured by ZEON Corporation) is a cycloolefin polymer (a hydrogenated product of a polymer produced by ring-opening polymerization of cyclic olefin) has Tg=142° C., $\Delta N_0$=+0.048 and a photoelastic coefficient of $-4 \times 10^{-12}$ Pa$^{-1}$. The oriented film of this polymer had a thickness of 100 µm and an in-plane phase retardation of 300 nm. As a result of a confirmation test, the stress after aging was 5 MPa.

This monolayer film was used as a phase retardation film. The film was laminated with a polarizing plate and a glass plate using an adhesive, as the first adhesive, composed of a copolymer of n-butyl acrylate, acrylic acid and methyl acrylate (P0082 manufactured by Lintel Corp., Tg=−28° C.) and an adhesive, as the second adhesive, composed of a copolymer of n-butyl acrylate and acrylic acid (P3132 manufactured by Lintec Corp., Tg=−42° C.). After the lamination, the laminate of the polarizing plate and the phase retardation film was peeled off. No second adhesive or no phase retardation film remained on the glass plate; thus, the workability was good. In addition, the laminate of the phase retardation film, the polarizing plate and the glass plate was evaluated for its durability in accordance with the method described supra. After 200 cycles of thermal shock aging, no cracks were found in the phase retardation film.

Moreover, by producing a uniaxially oriented film having a thickness distribution of outer layer/inner layer/outer layer=from 5/1/5 to 1/8/1 and an overall thickness from 30 to 200 µm using the above-mentioned polymer for both outer layers and a polymer of Reference Example 2 shown later for the inner layer, it is possible to obtain a phase retardation film which is superior in reworkability, durability and capability of improving viewing angle characteristic.

(3) Ethylene, styrene and norbornene were polymerized together so that the amount of constitutional units derived from styrene became 8% by weight and the amount of constitutional units derived from norbornene became 70% by weight. The resulting copolymer had Tg=138° C., $\Delta N_0$=+0.019 and a photoelastic coefficient of $-6 \times 10^{-12}$ Pa$^{-1}$. This polymer was formed into film by T-die extrusion and the film was uniaxially stretched by tentering. The oriented film had a thickness of 100 µm and an in-plane phase retardation of 50 nm. As a result of a confirmation test, the stress after aging was 5 MPa.

This monolayer film was used as a phase retardation film. The film was laminated with a polarizing plate and a glass plate using an adhesive, as the first adhesive, composed of a copolymer of n-butyl acrylate, acrylic acid and methyl acrylate (P0082 manufactured by Lintec Corp., Tg=−28° C.) and an adhesive, as the second adhesive, composed of a copolymer of n-butyl acrylate and acrylic acid (P3132 manufactured by Lintec Corp., Tg=−42° C.). After the lamination, the laminate of the polarizing plate and the phase retardation film was peeled off. No second adhesive or no phase retardation film remained on the glass plate; thus, the workability was good. In addition, the laminate of the phase retardation film, the polarizing plate and the glass plate was evaluated for its durability in accordance with the method described supra. After 200 cycles of thermal shock aging, no cracks were found in the phase retardation film.

Moreover, by producing a uniaxially oriented film having a thickness distribution of outer layer/inner layer/outer layer=from 5/1/5 to 1/8/1 and an overall thickness from 30 to 200 µm using the above-mentioned polymer for both outer layers and a polymer of Reference Example 2 shown later for the inner layer, it is possible to obtain a phase retardation film which is superior in reworkability, durability and capability of improving viewing angle characteristic.

Referential Example 1

APEL 5014DP (manufactured by Mitsui Chemicals, Inc.) has Tg=136° C., $\Delta N_0$=+0.016 and a photoelastic coefficient of $-6 \times 10^{-12}$ Pa$^{-1}$. This polymer is made up of 23% by weight of constitutional units derived from ethylene and 77% by weight of constitutional units derived from tetracyclo[4.4.0.1$^{2,5}$.1$^{7,10}$]-3-dodecene (dimethanooctahydronaphthalene). This polymer was formed into film by T-die extrusion and the film was uniaxially stretched by tentering. The oriented film had a thickness of 100 µm and an in-plane phase retardation of 50 nm. As a result of a confirmation test, the stress after aging was 5 MPa.

This monolayer film was used as a phase retardation film. The film was laminated with a polarizing plate and a glass plate using an adhesive, as the first adhesive, composed of a copolymer of n-butyl acrylate, acrylic acid and methyl acrylate (P0082 manufactured by Lintec Corp., Tg=−28° C.) and an adhesive, as the second adhesive, composed of a copolymer of n-butyl acrylate and acrylic acid (P3132 manufactured by Lintec Corp., Tg=−42° C.). After the lamination, the laminate of the polarizing plate and the phase retardation film was peeled off. No second adhesive or no phase retardation film remained on the glass plate; thus, the workability was good. In addition, the laminate of the phase retardation film, the polarizing plate and the glass plate was evaluated for its durability in accordance with the method described supra. After 200 cycles of thermal shock aging, no cracks were found in the phase retardation film.

Referential Example 2

Ethylene, styrene and tetracyclo[$4.4.0.1^{2,5}.1^{7,10}$]-3-dodecene (dimethanooctahydronaphthalene) were polymerized together so that the amount of constitutional units derived from styrene became 25% by weight and the amount of constitutional units derived from dimethanooctahydronaphthalene became 59% by weight. The resulting copolymer had Tg=144° C., $\Delta N_0$=−0.012 and a photoelastic coefficient of $-3 \times 10^{-12}$ $Pa^{-1}$.

Example 1

A multilayer film was formed by coextrusion using APEL 5014DP (manufactured by Mitsui Chemicals, Inc.) for outer layers and the polymer of Referential Example 2 for an inner layer. This film was uniaxially stretched by tentering. The oriented film had an overall thickness of 100 μm. The outer layers were 25 μm thick and the inner layer was 50 μm thick. In addition, the oriented film had a haze of 0.5%, a negative intrinsic birefringence, an in-plane phase retardation of 110 nm and a photoelastic coefficient of $-4 \times 10^{-12}$ $Pa^{-1}$. As a result of a confirmation test, the stress after aging was 5 MPa.

This multilayer film was processed into a 30-inch phase retardation film. The film was laminated with a polarizing plate and a glass plate using an adhesive, as the first adhesive, composed of a copolymer of n-butyl acrylate, acrylic acid and methyl acrylate (P0082 manufactured by Lintec Corp., Tg=−28° C.) and an adhesive, as the second adhesive, composed of a copolymer of n-butyl acrylate and acrylic acid (P3132 manufactured by Lintec Corp., Tg=−42° C.). After the lamination, the laminate of the polarizing plate and the phase retardation film was peeled off. No second adhesive or no phase retardation film remained on the glass plate; thus, the workability was good. In addition, the laminate of the phase retardation film, the polarizing plate and the glass plate was evaluated for its durability in accordance with the method described supra. After 200 cycles of thermal shock aging, no cracks were found in the phase retardation film.

Figure 1B:
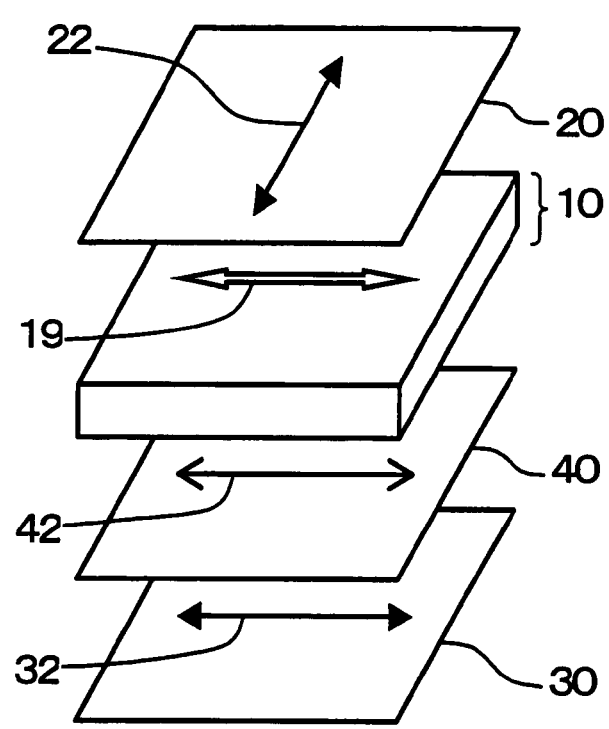

Using this phase retardation film, a liquid crystal display device whose structure is illustrated in FIGS. 1(A) and 1(B) was produced. FIG. 1(A) shows the layer structure of the liquid crystal display device and FIG. 1(B) shows the axis relationship of polarizing plates, a liquid crystal layer and a phase retardation film.

The phase retardation film 40 and a polarizing plate 30 were laminated on the back surface of an IPS mode liquid crystal cell 10 composed of a first and second transparent substrates 12, 11 and a liquid crystal layer 14 (namely, on the surface of the first transparent substrate 12) in the order; a second adhesive 56, the phase retardation film 40, a first adhesive 57 and the polarizing plate 30 from the first transparent substrate 12 of the liquid crystal cell 10. On the front surface (the surface of the second transparent substrate 11) of the liquid crystal cell 10, a first adhesive 55 and a polarizing plate 20 were laminated in this order. Here, the slow axis 42 of the phase retardation film 40 was arranged to be parallel to both the transmission axis 32 of the back-side polarizing plate 30 and the major axis 19 of liquid crystal molecules in the liquid crystal cell 10. The front-side polarizing plate 20 and the back-side polarizing plate 30 were arranged so that their transmission axes 22, 32 perpendicularly intersect. A backlight was installed on the back of this liquid crystal display device. The liquid crystal cell was evaluated for its viewing angle dependency on the basis of light leakage caused by change in viewing angle in a black display state where no voltage was applied. In the case where less light leakage was recognized even when viewed from any direction, the viewing angle dependency is low and the phase retardation film is judged to have good viewing angle characteristic. It was confirmed that the liquid crystal display device of this example leaked less light even if it was viewed from either the normal direction or the oblique direction and, therefore, it was superior in viewing angle characteristic.

Comparative Example 1

The polymer of Referential Example 2 was formed into film by T-die extrusion and the film was uniaxially stretched by tentering. The oriented film had a thickness of 100 μm, a haze of 0.5% and an in-plane phase retardation of 160 nm. As a result of a confirmation test, the stress after aging was 1 MPa.

This monolayer film was processed into a 30-inch phase retardation film. The film was laminated with a polarizing plate and a glass plate using an adhesive, as the first adhesive, composed of a copolymer of n-butyl acrylate, acrylic acid and methyl acrylate (P0082 manufactured by Lintec Corp., Tg=−28° C.) and an adhesive, as the second adhesive, composed of a copolymer of n-butyl acrylate and acrylic acid (P3132 manufactured by Lintec Corp., Tg=−42° C.). After the lamination, the laminate of the polarizing plate and the phase retardation film was peeled off. No second adhesive or no phase retardation film remained on the glass plate; thus, the workability was good. On the other hand, the laminate of the phase retardation film, the polarizing plate and the glass plate was evaluated for its durability in accordance with the method described supra. After 200 cycles of thermal shock aging, the phase retardation film had been cracked.

Comparative Example 2

A 30-inch phase retardation film the same as that of Comparative Example 1 was laminated with a polarizing plate and a glass plate using an adhesive, as the first adhesive, composed of a copolymer of n-butyl acrylate and acrylic acid (P3132 manufactured by Lintec Corp., Tg=−42° C.) and an adhesive, as the second adhesive, composed of a mixture of a copolymer of butyl acrylate and acrylic acid and a copolymer of n-butyl acrylate, methyl acrylate and butyl methacrylate (P236JP manufactured by Lintec Corp.). After the lamination, the laminate of the polarizing plate and the phase retardation film was peeled off. Some of the second adhesive remained on the glass plate; thus, the workability was poor. On the other hand, the durability was evaluated in accordance with the method described supra. After 200 cycles of thermal shock aging, no cracks were found in the phase retardation film.

Referential Example 4

DYLARK D332 (styrene-maleic anhydride based copolymer resin, manufactured by NOVA Chemicals Corporation) had Tg=131° C., a negative intrinsic birefringence and a photoelastic coefficient of +5×10$^{-12}$ Pa$^{-1}$. This polymer was formed into film by T-die extrusion and the film was uniaxially stretched by tentering. The oriented film had a thickness of 100 μm and an in-plane phase retardation of 140 nm. As a result of a confirmation test, the stress after aging was 1 MPa.

This monolayer film was used as a phase retardation film. The film was laminated with a polarizing plate and a glass plate using an adhesive, as the first adhesive, composed of a copolymer of n-butyl acrylate, acrylic acid and methyl acrylate (P0082 manufactured by Lintec Corp., Tg=−28° C.) and an adhesive, as the second adhesive, composed of a copolymer of n-butyl acrylate and acrylic acid (P3132 manufactured by Lintec Corp., Tg=−42° C.). After the lamination, the laminate of the polarizing plate and the phase retardation film was peeled off. Some of the second adhesive or the phase retardation film remained on the glass plate; thus, the workability was poor. The laminate of the phase retardation film, the polarizing plate and the glass plate was evaluated for its durability in accordance with the method described supra. After 200 cycles of thermal shock aging, the phase retardation film had been cracked.

Referential Example 5

TECHNOLOY S001 (acrylic resin containing about 20% by weight of acrylic rubber particle, manufactured by Sumitomo Chemical Co., Ltd.) has Tg=105° C. and a photoelastic coefficient of −5×10$^{-12}$ Pa$^{-1}$. This polymeric material contains no constitutional units derived from aromatic vinyl compounds.

Example 2

A multilayer film was formed by coextrusion using TECHNOLOY S001 (acrylic resin containing about 20% by weight of acrylic rubber particle, manufactured by Sumitomo Chemical Co., Ltd.) for outer layers and DYLARK D332 (styrene-maleic anhydride based copolymer resin, manufactured by NOVA Chemicals Corporation) for the inner layer. This film was uniaxially stretched by tentering. The oriented film had an overall thickness of 100 μm. The outer layers were 25 μm thick and the inner layer was 50 μm thick. In addition, the oriented film had a haze of 0.6%, a negative intrinsic birefringence, an in-plane phase retardation of 170 nm and a photoelastic coefficient of +5×10$^{-12}$ Pa$^{-1}$. As a result of a confirmation test, the stress after aging was 5 MPa.

This multilayer film was processed into a 30-inch phase retardation film. The film was laminated with a polarizing plate and a glass plate using an adhesive, as the first adhesive, composed of a copolymer of n-butyl acrylate, acrylic acid and methyl acrylate (P0082 manufactured by Lintec Corp., Tg=−28° C.) and an adhesive, as the second adhesive, composed of a copolymer of n-butyl acrylate and acrylic acid (P3132 manufactured by Lintec Corp., Tg=−42° C.). After the lamination, the laminate of the polarizing plate and the phase retardation film was peeled off. No second adhesive or no phase retardation film remained on the glass plate; thus, the workability was good. In addition, the laminate of the phase retardation film, the polarizing plate and the glass plate was evaluated for its durability in accordance with the method described supra. After 200 cycles of thermal shock aging, no cracks were found in the phase retardation film.

This phase retardation film and a polarizing plate were laminated on the back surface of an IPS mode liquid crystal cell composed of a first and second transparent substrates and a liquid crystal layer (namely, on the surface of the first transparent substrate) in the order: a second adhesive, the phase retardation film, a first adhesive and the polarizing plate from the first transparent substrate of the liquid crystal cell. On the front surface (the surface of the second transparent substrate) of the liquid crystal cell, a first adhesive and a polarizing plate were laminated in this order. Here, the slow axis of the phase retardation film was arranged to be parallel to both the transmission axis of the polarizing plate in the back-side polarizing plate and the longitudinal axis of liquid crystal molecules in the liquid crystal cell. The front-side polarizing plate and the back-side polarizing plate were arranged so that their transmission axes perpendicularly intersect. The layer constitution and the axis relationship of the liquid crystal display device produced herein are shown in FIG. 1. A backlight was installed on the back of this liquid crystal display device. The liquid crystal cell was evaluated for its viewing angle dependency on the basis of light leakage caused by change in viewing angle in a black display state where no voltage was applied. In the case where less light leakage was recognized even when viewed from any direction, the viewing angle dependency is low and the phase retardation film is judged to have good viewing angle characteristic. It was confirmed that the liquid crystal display device of this example leaked less light even if it was viewed from either the normal direction or the oblique direction and, therefore, it was superior in viewing angle characteristic.

What is claimed is:

1. A phase retardation film comprising two outer layers facing each other, and an inner layer interposed between the outer layers, each of the outer layers are formed of a non-styrene polymeric material and the inner layer being formed of a polymeric material with a negative intrinsic birefringence, wherein the phase retardation film has a negative intrinsic birefringence and a Haze from 0% to 1%.

2. The phase retardation film according to claim 1, wherein the film has a photoelastic coefficient whose absolute value is 10×10$^{-12}$ Pa$^{-1}$ or less.

3. The phase retardation film according to claim 1, wherein each of the polymeric materials forming the inner layer and the outer layers has a glass transition temperature of 100° C. or higher.

4. The phase retardation film according to claim 1, wherein the polymeric material forming the inner layer comprises a copolymer obtained by copolymerization of at least one compound selected from the group (A) defined below, at least one compound selected from the group (B) defined below and at least one compound selected from the group (C) defined below, the copolymer being composed of from 5 to 35% by weight of structural units derived from the at least one compound selected from the group (A), from 20 to 45% by weight of the at least one compound selected from the group (B) and from 45 to 75% by weight of the at least one compound selected from the group (C):

group (A): α-olefins having two or more carbon atoms;
group (B): aromatic vinyl compounds; and
group (C): cyclic olefins.

5. The phase retardation film according to claim 1, wherein the polymeric materials forming the outer layers are each independently a hydrogenated product of a polymer produced by copolymerization or ring-opening polymerization of an α-olefin having two or more carbon atoms and a cyclic olefin.

6. A liquid crystal display device comprising: a liquid crystal cell including two transparent substrates disposed in parallel and facing each other and a liquid crystal layer sandwiched by the substrates, two polarizing plates facing each other at least across the liquid crystal layer, and a phase retardation film disposed between the liquid crystal cell and at least one of the polarizing plates; wherein the phase retardation film is one comprising two outer layers facing each other and an inner layer interposed between the outer layers, each of the outer layers being formed of a non-styrene polymeric material and the inner layer being formed of a polymeric material with a negative intrinsic birefringence, the phase retardation film having a negative intrinsic birefringence and a Haze from 0% to 1%.

7. The liquid crystal display device according to claim 6, wherein the liquid crystal layer is one in which liquid crystal molecules are oriented parallel to the transparent substrates in a state where no electric field is applied.

8. The liquid crystal display device according to claim 6, wherein the phase retardation film is adhered to the liquid crystal cell and/or a polarizing plate facing the phase retardation film faces with an adhesive comprising a single kind of copolymer which has a glass transition temperature from −50° C. to −20° C. and which has been produced by copolymerization of n-butyl acrylate and other monomer.

9. The liquid crystal display device according to claim 6, wherein the phase retardation film has a photoelastic coefficient whose absolute value is $10 \times 10^{-12}$ $Pa^{-1}$ or less.

10. The liquid crystal display device according to claim 6, wherein in the phase retardation film each of the polymeric materials forming the inner layer and the outer layers has a glass transition temperature of 100° C. or higher.

11. The liquid crystal display device according to claim 6, wherein in the phase retardation film the polymeric material forming the inner layer comprises a copolymer obtained by copolymerization of at least one compound selected from the group (A) defined below, at least one compound selected from the group (B) defined below and at least one compound selected from the group (C) defined below, the copolymer being composed of from 5 to 35% by weight of structural units derived from the at least one compound selected from the group (A), from 20 to 45% by weight of the at least one compound selected from the group (B) and from 45 to 75% by weight of the at least one compound selected from the group (C):

group (A): α-olefins having two or more carbon atoms;
group (B): aromatic vinyl compounds; and
group (C): cyclic olefins.

12. The liquid crystal display device according to claim 6, wherein in the phase retardation film the polymeric materials forming the outer layers are each independently a hydrogenated product of a polymer produced by copolymerization or ring-opening polymerization of an α-olefin having two or more carbon atoms and a cyclic olefin.

* * * * *